United States Patent

Huss

Patent Number: 5,907,992
Date of Patent: Jun. 1, 1999

[54] ABRASION RESISTANT DIAPHRAGM

[75] Inventor: Howard D. Huss, Westmoreland City, Pa.

[73] Assignee: Westinghouse Air Brake Company, Wilmerding, Pa.

[21] Appl. No.: 08/870,943

[22] Filed: Jun. 6, 1997

[51] Int. Cl.⁶ .................................. F01B 19/00
[52] U.S. Cl. .................. 92/103 F; 92/103 SD
[58] Field of Search .............. 92/103 R, 103 F, 92/103 SD

[56] References Cited

U.S. PATENT DOCUMENTS

| | | | |
|---|---|---|---|
| 4,864,918 | 9/1989 | Martin | 92/103 SD |
| 4,951,554 | 8/1990 | Scott et al. | 92/103 F |
| 5,217,797 | 6/1993 | Knox et al. | 92/103 F X |
| 5,291,822 | 3/1994 | Alsobrooks et al. | 92/103 F X |

FOREIGN PATENT DOCUMENTS 202790  4/1959  Austria ................. 92/103 R

*Primary Examiner*—Hoang Nguyen
*Attorney, Agent, or Firm*—James Ray & Associates

[57] ABSTRACT

The present invention provides an improved diaphragm which will substantially resist detrimental abrasive wear. Such diaphragm being used in certain applications in which at least a portion of such diaphragm moves relative to and is in contact with a nonflexing surface which would tend to abrade and excessively wear such diaphragm. Such diaphragm includes at least one layer of a flexible material. Such at least one layer of such flexible material being selected from a group consisting of EPDM, nitrites, neoprene, fluoroelastomers and various mixtures thereof. This layer of such flexible material has a first predetermined thickness. Such diaphragm further has at least a portion of such at least one layer of such flexible material disposed at least adjacent such nonflexing surface. This portion of the diaphragm has a second predetermined thickness. The second predetermined thickness being greater than such first predetermined thickness. The at least a portion of such at least one layer of flexible material is disposed at least adjacent such nonflexing surface and has such second predetermined thickness positioned on a predetermined side of such diaphragm. Such diaphragm also includes an aperture, having a predetermined diameter, formed through and substantially in a diametric center of such at least one layer of a flexible material and such at least a portion of such at least one layer of such flexible material having such second predetermined thickness.

18 Claims, 1 Drawing Sheet

ABRASION RESISTANT DIAPHRAGM

FIELD OF THE INVENTION

The present invention relates, in general, to diaphragms which are subjected to detrimental wear during service due to abrasion caused by contact with nonflexing type surfaces which move relative to such diaphragms when used in pumps and pumping systems and, more particularly, this invention relates to diaphragms that have been modified to substantially reduce such abrasion and wear in the area of the diaphragm that is in contact with the nonflexing surfaces where wear is most likely to occur.

BACKGROUND OF THE INVENTION

As is generally well known in the prior art, diaphragms are an integral part of pumps. It is necessary in these applications for the diaphragms to be flexible in order for them to perform their intended function. However, the constant flexing of certain portions of the diaphragm when the pump is in use creates stresses on the nonflexing portions of the diaphragm that are attached to the pump.

In these type pumps there is a follower and flange which support the diaphragm and help to secure it in place within the pump housing. These areas of the diaphragm which are in movable contact with these followers and flanges will normally exhibit rather severe wear and, after extended use with the constant flexing of the diaphragm, will eventually crack and/or have holes wear through the diaphragm. When this occurs the pump is out of commission until a new diaphragm can be installed to replace the worn out diaphragm.

In many cases the rest of the diaphragm is still in relatively good shape. It is primarily at the wear points of such diaphragm caused by the relative movement between the diaphragm and the follower and flange members, under normal circumstances, that the diaphragm will reveal major problems. The replacement of the diaphragm, however, is only one of the problems that maintenance personnel encounter. The location of many pumps is such that not only may they be very difficult to get to but, even after reaching the pump, performing the work of replacing a diaphragm can and oftentimes does present a real challenge.

Thus, the longer a pump can be kept in operation, without the need for servicing, represents a considerable savings in not only the maintenance personnel's time but in the "up" time for whatever operation the pump is being used. Any improvement in the design of the diaphragm that can significantly increase its usable life expectancy is a welcome improvement.

The present invention is specifically related to improving the wear characteristics of a diaphragm at the aforementioned stress points at the follower and flange areas of the diaphragm.

SUMMARY OF THE INVENTION

The present invention provides an improved diaphragm which will substantially resist detrimental abrasive wear. Such diaphragm being used in certain applications in which at least a portion of such diaphragm moves relative to and is in contact with a nonflexing surface which would tend to abrade and excessively wear such diaphragm by a constant flexing of such diaphragm during service. Such diaphragm includes at least one layer of a flexible material. Such at least one layer of such flexible material being selected from a group consisting of EPDM, nitriles, neoprene, fluoroelastomers and various mixtures thereof. This at least one layer of such flexible material has a first predetermined thickness. Such diaphragm further has at least a portion of such at least one layer of such flexible material disposed at least adjacent such nonflexing surface. This portion of the diaphragm has a second predetermined thickness. The second predetermined thickness being greater than such first predetermined thickness. The at least a portion of such at least one layer of flexible material is disposed at least adjacent such nonflexing surface and has such second predetermined thickness positioned on a predetermined side of such diaphragm. Such diaphragm also includes an aperture, having a predetermined diameter, formed through and substantially in a diametric center of such at least one layer of a flexible material and such at least a portion of such at least one layer of such flexible material having such second predetermined thickness.

OBJECTS OF THE INVENTION

It is, therefore, one of the primary objects of the present invention to provide an improved diaphragm that will resist significant wear at least around the periphery of the follower and/or flange area where such diaphragm is most susceptable to wear.

Another object of the present invention is to provide an improved diaphragm which will exhibit improved wear by increasing the thickness of the diaphragm in such follower and/or flange area so that such follower and/or flange will not be in rubbing contact with that portion of the diaphragm that is subjected to flexing.

Still another object of the present invention is to provide an improved diaphragm which will not substantially affect such diaphragm's flexibility by increasing the thickness of such diaphragm at least in the area where it is secured to such follower and/or flange portion of the pump.

Additionally, it is an object of the present invention to provide an improved diaphragm which is resistant to abrasive wear and that would be ready for use after molding without any significant additional processing.

Yet another object of the present invention is to provide an improved diaphragm which is relatively easy and inexpensive to manufacture.

A further object of the present invention is to provide an improved diaphragm which will significantly reduce the downtime of the pump in which such diaphragm is used thereby providing increased productivity.

Still yet another object of the present invention is to provide an improved diaphragm which can be manufactured in a number of different sizes and from a number of different materials without adversely affecting operating performance of such diaphragm.

In addition to the several objects and advantages of the present invention which has been described in some detail above, various other objects and advantages of the invention will become much more readily apparent to those persons who are skilled in pumping systems and, more particularly, to diaphragms used in such pumps from the following more detailed description of such invention, particularly, when such detailed description is taken in conjunction with the attached drawing Figures and with the appended claims.

Figure 1:
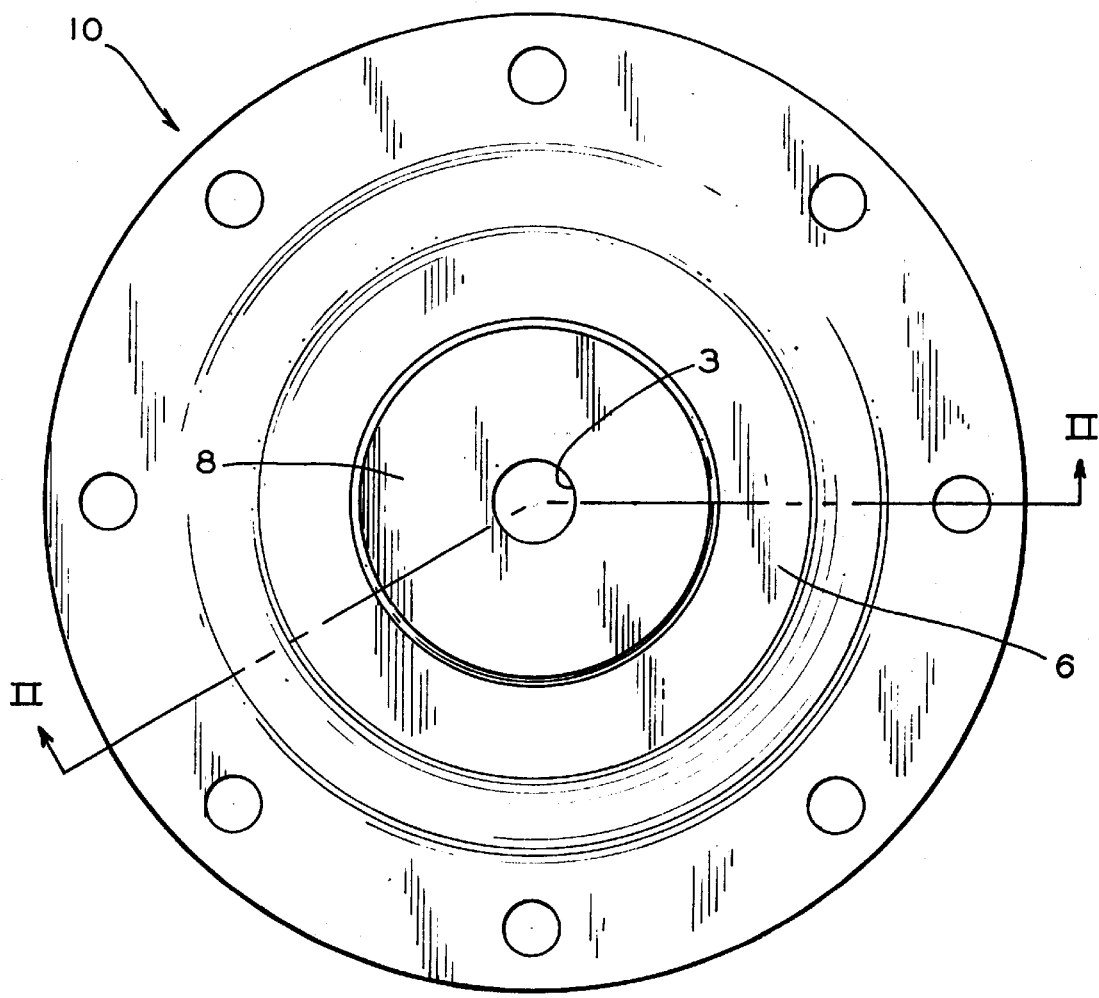
FIG. 1 is a plan view of a typical circular type diaphragm having incorporated therein a presently preferred embodiment of the invention.

BRIEF DESCRIPTION OF THE PRESENTLY PREFERRED AND VARIOUS ALTERNATIVE EMBODIMENTS OF THE PRESENT INVENTION

Prior to proceeding to the more detailed description of the present invention, it should be noted that for the sake of clarity in understanding the invention, identical components with identical functions have been designated with identical reference numerals throughout the drawing Figures.

Figure 2:
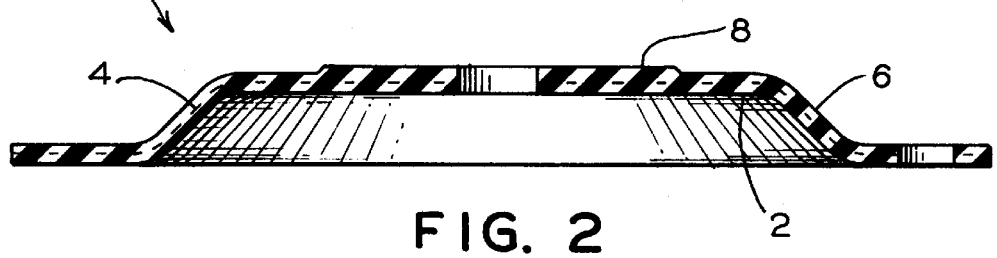
FIG. 2 is a cross-sectional view of the diaphragm that is taken along the lines II—II of FIG. 1.

Reference is now made, more particularly, to FIGS. 1 and 2. Illustrated therein is a presently preferred embodiment of the diaphragm, which has been generally designated 10. As noted above, FIG. 1 is a plan view of such diaphragm 10 showing the presently preferred basic shape of one such diaphragm 10. There is an aperture 3 formed substantially through the diametric center of such diaphragm 10. The threaded end portion of a piston rod (not shown) goes through such aperture 3 of such diaphragm 10 for flexing such diaphragm 10 during operation. FIG. 2 is a cross-sectional view of such circular diaphragm 10 across a diameter thereof.

This view shows a multilayered composite type diaphragm 10 with such first layer 2 being an elastomer, an inner layer 4 being a fabric type material and a second layer 6 also being an elastomer. First layer 2 and second layer 6 may be the same or different type elastomers. Such elastomers are selected from a group consisting of fluoroelastomers, nitrites, neoprene, and ethylene propylene diene monomers (EPDM), and various mixtures thereof. In a presently preferred embodiment of the invention such elastomers are bonded around the fabric inner layer 4. In such presently preferred embodiment of the invention such fabric inner layer 4 is preferably a polyamide, such as nylon. This fabric inner layer 4 provides a requisite amount of reinforcement to such diaphragm 10.

As is evident in FIG. 2, the second layer 6 has a raised portion 8, which is preferably made of the same material as such second layer 6. Thus, this portion of the diaphragm 10 is made thicker than the rest of the diaphragm 10. Such raised portion 8 preferably has a predetermined diameter of between about 3 inches and about 4 inches. This diameter corresponds generally to the diameter of a follower (not shown). With the raised portion 8, such follower (not shown) does not come into intimate contact with the flexing portion of the diaphragm 10 and as such does not wear on the outer surface of the second layer 6 of diaphragm 10.

The presently preferred thickness of the raised portion 8 of such diaphragm 10 is between about 0.025 and about 0.040 inches and is normally sufficient to keep the follower from contacting that portion of the diaphragm 10 that flexes. The more preferred thickness of the raised portion 8 of such diaphragm 10 is between about 0.030 and about 0.035 inches. Such raised portion 8 of the diaphragm 10 is preferably the same material as such second layer 6. Additionally, because the diaphragm 10 is thicker in the portion of the diaphragm 10 that comes in contact with such follower by between about 0.025 and about 0.040 inches than is the rest of the diaphragm 10, it has been found that a significant increase in the number of operating cycles can be readily achieved.

Figure 3:
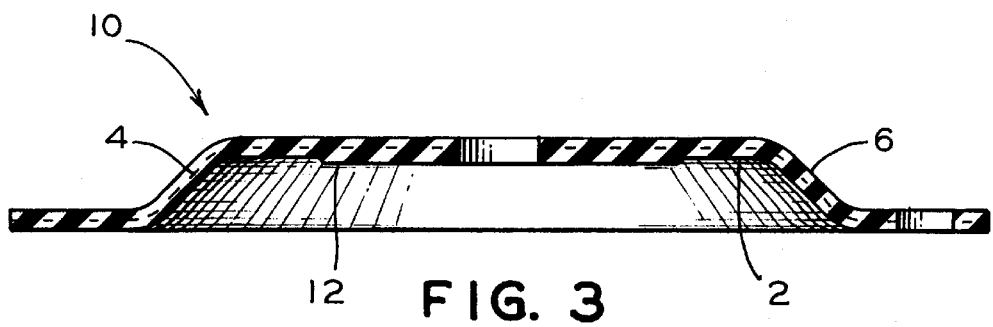
FIG. 3 is a cross-sectional view which illustrates an alternate embodiment of the present invention.

FIG. 3 shows an alternate embodiment of the present invention. In this embodiment the first layer 2 includes a raised portion 12 which is preferably made of the same material as first layer 2. Such raised portion 12 is disposed on the opposite side of the diaphragm 10 from the side with raised portion 8 of the FIGS. 1 and 2 embodiment. Whereas raised portion 8 was in contact with a follower and was positioned on the fluid side of the diaphragm 10, such raised portion 12 is in contact with a flange (not shown) and is positioned on the air side of diaphragm 10. Pump parts such as follower and flange used to secure a diaphragm are often referred to in the art as outer and inner piston. Such follower or outer piston is in contact with such diaphragm on the fluid side of the diaphragm while the flange or inner piston is on the air side of such diaphragm.

Raised portion 12 of such diaphragm 10 preferably has a thickness of between about 0.025 and about 0.040 inches and this thickness is normally sufficient to keep the flange member from contacting that portion of the diaphragm 10 that flexes. Thus, this portion of the diaphragm 10 is made thicker than the rest of the diaphragm 10. Such raised portion 12 preferably has a predetermined diameter of between about 3 inches and about 4 inches. This diameter corresponds generally to the diameter of a flange (not shown). With the raised portion 12, such flange (not shown) does not come into intimate contact with the flexing portion of the diaphragm 10 and as such does not wear on the outer surface of the first layer 2 of diaphragm 10.

Such raised portion 12 of the diaphragm 10 is preferably the same material as such first layer 2. Additionally, because the diaphragm 10 is thicker in the portion of the diaphragm 10 that comes in contact with such flange by between about 0.025 and about 0.040 inches than is the rest of the diaphragm 10, it has been found that a significant increase in the number of operating cycles can be readily achieved.

When such diaphragm 10, with the instant invention of the raised portion 8, was tested in the laboratory for failure because of undesirable cracks or holes at the wear area, such diaphragm 10 exceeded 7 million cycles and still did not display any evidence of failure. By having the follower only in contact with the raised portion 8 of diaphragm 10 and not with the flexing portion of the diaphragm 10, the abrasion resulting from the constant flexing of the diaphragm 10, while in service, is markedly reduced and the life of the diaphragm is significantly extended. Such raised portion 8, in one presently preferred embodiment of the invention, is on the fluid side of the diaphragm 10, while in an alternate embodiment, such raised portion 12 is on the air side.

Although FIGS. 2 and 3 illustrate a diaphragm 10 which includes a fabric inner layer 4, it should be noted that it is within the scope of the present invention to provide such a diaphragm 10 that does not require the use of a fabric inner layer 4. However, when such fabric inner layer 4 is used in such diaphragm 10, the fabric is preferably selected from one of the various nylon formulations.

The diaphragm 10 with either a raised portion 8 or a raised portion 12 are molded as such and, thus, no further processing other than punching out the center aperture 3 is necessary when the diaphragm 10 is removed from the mold.

While a presently preferred and an alternative embodiment of the present invention have been described in detail above, it should be understood that various other adaptations and/or modifications of the present invention can be made by those persons who are particularly skilled in the art related to pumping systems and, more particularly, diaphragms used in such pumping systems without departing from either the spirit of the invention or the scope of the appended claims.

I claim:

1. An improved diaphragm which will substantially resist detrimental abrasive wear by preventing intimate contact between a flexing portion of said diaphragm and a nonflexing surface, said diaphragm being used in certain applications in which at least a portion of said diaphragm moves relative to and is in contact with such nonflexing surface which could tend to abrade and excessively wear said diaphragm by a constant flexing of said diaphragm during service, said diaphragm comprising:

(a) at least one layer of an elastomeric material, said at least one layer of said elastomeric material being selected from a group consisting of EPDM, nitrites, neoprene, fluoroelastomers and various mixtures thereof, said at least one layer of said elastomeric material having a first predetermined thickness and a predetermined configuration, said at least one layer of said elastomeric material having an inner layer of a fabric type material;

(b) at least a predetermined portion of said at least one layer of said elastomeric material is disposed at least adjacent such nonflexing surface and includes a second predetermined thickness, said at least a predetermined portion of said at least one layer of said elastomeric material having a diameter substantially equal to such nonflexing surface, said second predetermined thickness being greater than said first predetermined thickness, said at least a predetermined portion of said at least one layer of said elastomeric material disposed at least adjacent such nonflexing surface and having said second predetermined thickness being positioned on a predetermined side of said diaphragm whereby intimate contact between said flexing portion of said diaphragm and such nonflexing surface is prevented, said second predetermined thickness is generally between about 0.25 and 0.40 inches greater than said first predetermined thickness; and (c) an aperture, having a predetermined diameter, formed through and substantially in a diametric center of said at least one layer of said elastomeric material and said inner layer of a fabric type material and said at least a predetermined portion of said at least one layer of said elastomeric material having said second predetermined thickness.

2. An improved diaphragm which will substantially resist detrimental abrasive wear, according to claim 1, wherein said fabric inner layer is nylon.

3. An improved diaphragm which will substantially resist detrimental abrasive wear, according to claim 2, wherein said at least a portion of said at least one layer of said elastomeric material disposed at least adjacent such nonflexing surface and having said second predetermined thickness is disposed adjacent a follower.

4. An improved diaphragm which will substantially resist detrimental abrasive wear, according to claim 1, wherein said at least a portion of said at least one layer of said elastomeric material disposed at least adjacent such nonflexing surface and having said second predetermined thickness is disposed adjacent a flange.

5. An improved diaphragm which will substantially resist detrimental abrasive wear, according to claim 1, wherein said second predetermined thickness is generally between about 0.03 and about 0.035 inches greater than said first predetermined thickness.

6. An improved diaphragm which will substantially resist detrimental abrasive wear, according to claim 1, wherein said at least a portion of said at least one layer of said elastomeric material disposed at least adjacent such nonflexing surface and having said second predetermined thickness has a diameter of between about 3.0 inches and about 4.0 inches.

7. An improved diaphragm which will substantially resist detrimental abrasive wear, according to claim 6, wherein said at least a portion of said at least one layer of said elastomeric material disposed at least adjacent such nonflexing surface and having said second predetermined thickness generally exhibits a diameter substantially equal to a follower.

8. An improved diaphragm which will substantially resist detrimental abrasive wear, according to claim 6, wherein said at least a portion of said at least one layer of said elastomeric material disposed at least adjacent such nonflexing surface and having said second predetermined thickness generally exhibits a diameter substantially equal to a flange.

9. An improved diaphragm which will substantially resist detrimental abrasive wear, according to claim 1, wherein said at least one layer of said flexible material is EPDM.

10. An improved diaphragm which will substantially resist detrimental abrasive wear, according to claim 1, wherein said at least one layer of said elastomeric material is nitrile.

11. An improved diaphragm which will substantially resist detrimental abrasive wear, according to claim 1, wherein said at least one layer of said elastomeric material is neoprene.

12. An improved diaphragm which will substantially resist detrimental abrasive wear, according to claim 1, wherein said at least one layer of said elastomeric material is a fluroelastomer.

13. An improved diaphragm which will substantially resist detrimental abrasive wear, according to claim 1, wherein said at least one layer of said elastomeric material selected from said group consisting of EPDM, nitriles, neoprene, fluoroelastomers and various mixtures thereof is a mixture.

14. An improved diaphragm which will substantially resist detrimental abrasive wear, according to claim 1, wherein said improved diaphragm further includes a predetermined number of apertures formed through said at least one layer closely adjacent an outer perphery thereof to facilitate mounting of said diahargm within such pump.

15. An improved diaphragm which will substantially resist detrimental abrasive wear, according to claim 1, wherein said predetermined diameter of said aperture is substantially equal to a diameter of a piston rod disposed within such pump and which carries at least one of such follower and such flange.

16. An improved diaphragm which will substantially resist detrimental abrasive wear, according to claim 1, wherein each of said at least one layer of said elastomeric material and said at least a predetermined portion of said at least one layer of said elastomeric material disposed at least adjacent such nonflexing surface is selected from said group consisting of EPDM, nitrites, neoprene, fluoroelastomers and various mixtures thereof.

17. An improved diaphragm which will substantially resist detrimental abrasive wear, according to claim 16, wherein one of said each of said at least one layer of said elastomeric material and said at least a predetermined portion of said at least one layer of said elastomeric material disposed at least adjacent such nonflexing surface is selected from one of said group consisting of EPDM, nitriles, neoprene and fluoroelastomers and an opposite one of said each of said at least one layer of said elastomeric material and said at least a predetermined portion of said at least one layer of said elastomeric material disposed at least adjacent such nonflexing surface is selected from a different one of said group consisting of EPDM, nitrites, neoprene and fluoroelastomers.

18. An improved diaphragm which will substantially resist detrimental abrasive wear, according to claim 1, wherein said predetermined configuration of said at least one layer of said elastomeric material is generally round.

* * * * *